(12) United States Patent
Bergeron

(10) Patent No.: US 12,399,044 B2
(45) Date of Patent: Aug. 26, 2025

(54) DIAGNOSTIC COVERAGE IMPROVEMENTS IN REDUNDANT SENSOR ELEMENT FAULT DETECTION ARCHITECTURES

(71) Applicant: Analog Devices, Inc., Wilmington, MA (US)

(72) Inventor: Joe Bergeron, Greensboro, NC (US)

(73) Assignee: Analog Devices, Inc., Wilmington, MA (US)

( * ) Notice: Subject to any disclaimer, the term of this patent is extended or adjusted under 35 U.S.C. 154(b) by 361 days.

(21) Appl. No.: 17/985,694

(22) Filed: Nov. 11, 2022

(65) Prior Publication Data

US 2024/0159578 A1    May 16, 2024

(51) Int. Cl.
| | |
|---|---|
| *G01D 21/02* | (2006.01) |
| *G01D 18/00* | (2006.01) |
| *G06F 11/00* | (2006.01) |
| *G05B 23/02* | (2006.01) |

(52) U.S. Cl.
CPC .......... *G01D 21/02* (2013.01); *G06F 11/00* (2013.01); *G05B 23/0221* (2013.01)

(58) Field of Classification Search
CPC .. B60W 20/50; B60W 50/02; B60W 50/0205; B60W 50/023; B60W 50/029; B60W 2050/021; B60W 2050/0215; B60W 2050/0292; B60W 2050/0295; B60W 2050/0297; G05B 9/03; G05B 23/0218; G05B 23/0221; G05B 23/0224; G05B 23/0227; G05B 23/0229; G05B 23/0232; G05B 23/0235; G05B 23/0237; G05B 23/024; G05B 23/0243; G05B 23/0245; G05B 23/0248; G05B 23/0251; G05B 23/0254; G05B 23/0256

See application file for complete search history.

(56) References Cited

U.S. PATENT DOCUMENTS

| | | | | |
|---|---|---|---|---|
| 5,710,776 A | * | 1/1998 | Tomlinson | G05B 9/03 714/704 |
| 5,761,090 A | * | 6/1998 | Gross | G05B 19/4184 706/45 |
| 5,774,378 A | * | 6/1998 | Yang | G01F 15/024 702/109 |
| 6,741,919 B1 | * | 5/2004 | Schuster | G05B 9/02 701/29.9 |
| 6,757,579 B1 | * | 6/2004 | Pasadyn | G05B 13/04 700/52 |
| 11,914,357 B1 | * | 2/2024 | Nguyen | G05B 23/0254 |
| 12,163,867 B1 | * | 12/2024 | Vilim | G01M 99/00 |
| 2006/0085102 A1 | * | 4/2006 | Doel | G05B 23/0232 701/4 |

(Continued)

*Primary Examiner* — Herbert K Roberts
(74) *Attorney, Agent, or Firm* — ArentFox Schiff LLP

(57) ABSTRACT

Aspects of the present disclosure provide apparatuses for minimizing the impacts of differences in sensor measurements while sensors are being used. An apparatus in accordance with an aspect of the present disclosure may comprise a first sensor, a second sensor, a combiner, coupled to the first sensor and the second sensor, and a comparator, coupled to the first sensor and the second sensor, wherein the combiner and comparator modify a dynamic limit of the apparatus based at least in part on a first uncertainty in a first output of the first sensor and a second uncertainty in a second output of the second sensor.

18 Claims, 6 Drawing Sheets

(56) References Cited

U.S. PATENT DOCUMENTS

| | | | |
|---|---|---|---|
| 2009/0198408 A1* | 8/2009 | Salman | B60W 50/0205 |
| | | | 701/29.2 |
| 2011/0125419 A1* | 5/2011 | Bechhoefer | F03D 17/00 |
| | | | 702/34 |
| 2013/0293217 A1* | 11/2013 | Moiseev | G05B 9/03 |
| | | | 324/76.77 |
| 2015/0169393 A1* | 6/2015 | Shibuya | G05B 23/0243 |
| | | | 702/182 |
| 2015/0351670 A1* | 12/2015 | Vanslyke | A61B 5/746 |
| | | | 600/301 |
| 2017/0370985 A1* | 12/2017 | Rachmawati | G05B 9/02 |
| 2018/0031428 A1* | 2/2018 | Uno | G01K 3/005 |
| 2018/0307218 A1* | 10/2018 | Lavid Ben Lulu | |
| | | | G06F 16/90335 |
| 2019/0235482 A1* | 8/2019 | Subramaniyan | G05B 23/0243 |
| 2021/0149465 A1* | 5/2021 | Hiltner | G06F 1/206 |
| 2021/0335059 A1* | 10/2021 | Dixit | G05B 23/0254 |
| 2022/0051017 A1* | 2/2022 | Choi | G06V 10/764 |
| 2022/0162998 A1* | 5/2022 | Lee | F02C 7/32 |
| 2022/0171376 A1* | 6/2022 | Kim | G05B 19/41885 |
| 2022/0176547 A1* | 6/2022 | Smith | A61H 1/0255 |
| 2023/0195413 A1* | 6/2023 | Kastrup | H03K 19/21 |
| | | | 708/200 |
| 2023/0400508 A1* | 12/2023 | Freese | G05B 23/0235 |
| 2024/0308660 A1* | 9/2024 | Strihagen | B64D 7/00 |

\* cited by examiner

DIAGNOSTIC COVERAGE IMPROVEMENTS IN REDUNDANT SENSOR ELEMENT FAULT DETECTION ARCHITECTURES

BACKGROUND

Technical Field

The present disclosure generally relates to fault detection, and more particularly, to diagnostic coverage improvements in redundant sensor element fault detection architectures.

Introduction

Electronic devices are often used as sensors that respond to physical stimuli, and other electronics, broadly referred to as transducers, provide an electronic representation of the sensor's response. Within some systems, multiple sensors may be used to provide enhanced sensor responses. The response from each sensor may be averaged or otherwise compared to allow for better performance, reduced errors, identifying faults, or improving other system parameters.

There are also many possibilities for errors from sensors in redundant sensor systems. Differences in operating temperature, power supplied to each sensor, signal levels, etc., may provide different responses that are then compared, averaged, etc., to achieve an electronic representation of the overall response. Reducing these inaccuracies in each sensor or each of the sensor paths may increase costs. Further, operating sensors away from nominal operating points may increase the errors that sensors introduce, which may degrade the specifications for a given sensor to accommodate the additional range of infrequent but expected larger inputs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides apparatuses for minimizing the impacts of differences in sensor measurements while sensors are being used. In an aspect of the present disclosure, sensors can be operated at a wider range of conditions. The present disclosure provides apparatuses for identifying sensor faults with increased resolution, even with very wide range sensors that could otherwise mask faults.

An apparatus in accordance with an aspect of the present disclosure may comprise a first sensor, a second sensor, a combiner, coupled to the first sensor and the second sensor, and a comparator, coupled to the first sensor and the second sensor, wherein the combiner and comparator modify a dynamic limit of the apparatus based at least in part on a first uncertainty in a first output of the first sensor and a second uncertainty in a second output of the second sensor. In an aspect of the present disclosure, such an apparatus may enable increased resolution of faults that can be detected in spite of using wider range sensors.

Such an apparatus further optionally includes the combiner averaging the first output and the second output, the comparator comparing an average of the first output and the second output against a threshold, the first and/or second uncertainty respectively in the first output and/or the second output being determined at least in part by one or more of a noise error, an uncertainty error, a scale error, a quantization error, and a sensor uncertainty, the dynamic limit being based at least in part on an input to the first sensor and the second sensor, and the dynamic limit increasing as the input deviates from a nominal value.

Such an apparatus further optionally comprises a first averager coupled to the first sensor, the first averager averaging a plurality of first outputs of the first sensor, the combiner averaging an output of the first averager with the second output, a second averager coupled to the second sensor, the second averager averaging a plurality of second outputs of the second sensor, and the combiner averaging an output of the first averager and an output of the second averager. Averaging or filtering sensor responses may offer an opportunity for increased fidelity in fault detection.

An integrated sensor in accordance with an aspect of the present disclosure may comprise a first sensor, a second sensor, a combiner, coupled to the first sensor and the second sensor, and a comparator, coupled to the first sensor and the second sensor, wherein the combiner and comparator modify a dynamic limit of the integrated sensor based at least in part on an average of a first uncertainty in a first output of the first sensor and a second uncertainty in a second output of the second sensor.

Such an integrated sensor may further optionally include the combiner averaging the first output and the second output, the comparator comparing an average of the first output and the second output against a threshold, the first and/or second uncertainty respectively in the first output being determined at least in part by one or more of a noise error, an uncertainty error, a scale error, a quantization error, and a sensor uncertainty, and the dynamic limit being based at least in part on an input to the first sensor and the second sensor.

Such a sensor arrangement may further optionally include a first averager coupled to the first sensor, and the combiner averages an output of the first averager.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
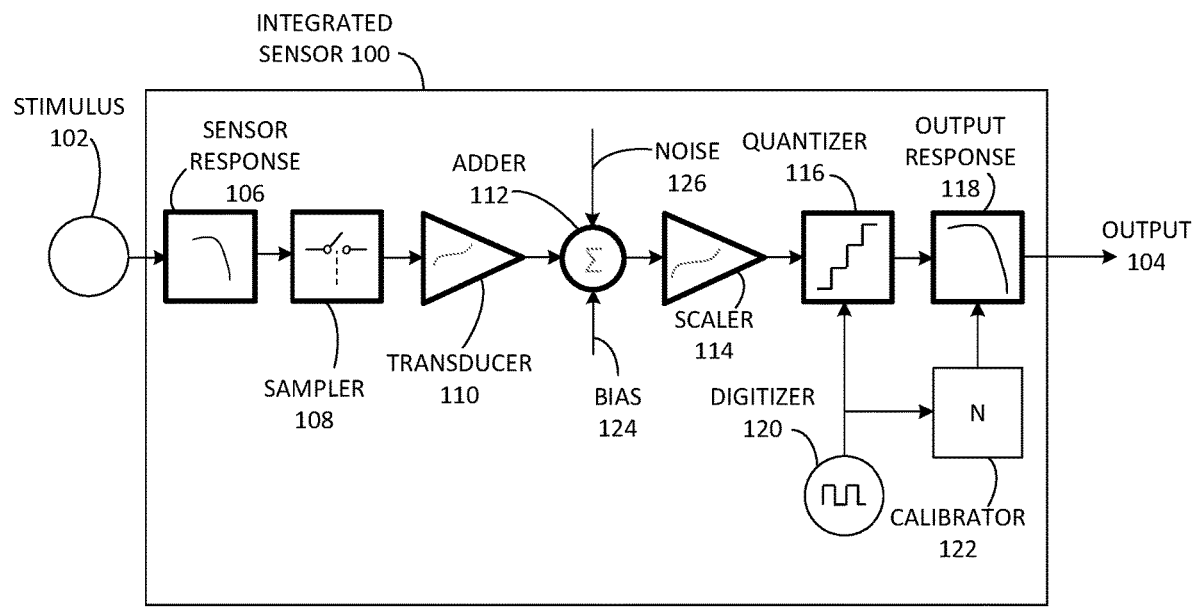
FIG. 1 is a block diagram of an integrated sensor in accordance with an exemplary aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Introduction

For a system to operate properly and safely, determination of system safety goals and their allocation to items and elements in the system may be used to reduce opportunities for unsafe faults. Faults within a system may be defined as conditions that can cause termination of the system's ability to perform its function as desired. When faults are detected, action can be taken for the system to remain in a safe operating state. Alternatively, or in addition to fault detection, faults can be restricted or categorized to levels appropriate for the risks introduced by the fault and/or the probability of occurrence of such faults.

Because many elements and sensors are often used in designs, there can be difficulties in ensuring individual sensors (also referred to as "elements" herein) avoid developing undetected random faults and failures. Random faults and failures may lead to undetected safety goal violations. As such, sensor implementation may be designed to manage and limit these random faults to levels commensurate with the risks and exposure that they can create. Alternatively, or in addition to this limitation of safety risk, the system or item using the sensor may adopt alternative approaches to determine faults to manage the faults appropriately.

Many systems attempt to improve performance assessments using a redundant sensor element fault detection architecture to aide in assuring functional safety goal fulfillment. Using sensor measurement statistics and employing measurement dependent redundancy expectations to assess the sensors' performance can improve error resolution without increased false alarm reports. Using increased sensor performance expectations in lieu of signal independent defined sensor performance can improve system capability and increase safety performance goals.

Often, diagnostic safety mechanisms (DSMs) identify fault outcomes and limit system exposure to potential failure. DSMs can reveal abnormal performance by assessing symptomatic responses, as well as monitor other sensor behaviors to measure operational changes or outputs beyond design expectations. Using DSMs to meet a safety goal often employs testing sensors against the sensor's operational limits.

In general, an element or sensor's suitability for a given application, and performance in a given application can be evaluated, and its capabilities assessed for their ability to meet functional safety requirements.

Overview

FIG. 1 is a block diagram of an integrated sensor in accordance with an exemplary aspect of the present disclosure.

FIG. 1 illustrates an integrated sensor 100 (which may also be referred to as an apparatus herein), having a stimulus 102 as an input and also having an output 104. Stimulus 102 may be a force, an acceleration, or other stimulus that can be detected by integrated sensor 100, while output 104 may be an electrical, optical, or other signal that can be transmitted or interpreted by another system or directly by a user. Within integrated sensor 100 is a sensor response 106, a sampler 108, a transducer 110, an adder 112, a scaler 114, a quantizer 116, an output response 118, a digitizer 120, and a calibrator 122. Other block diagrams that describe similar functions for integrated sensor 100 may be used without departing from the scope of the present disclosure.

Sensor response 106 is a representation of the sensor response curve for various stimuli. For example, and not by way of limitation, sensor response 106 may be the frequency response of a given sensor, the sensitivity response of a gyro, etc. Sampler 108 is a representation of how often the sensor element is sampled, e.g., once a second, once every millisecond, etc.

Transducer 110 converts and/or amplifies the sampled sensor response to an electrical signal that can be scaled and calibrated. Adder 112 allows for the addition of bias signal (s) 124, but also shows that noise 126 may be added into the electrical signal coming from the sensor. Noise 126 may include, e.g., cross-sensor contamination, electromagnetic interference, operational conditions such as vibration of the sensors, and/or other inputs that become part of the sensor output 104 not generated by the elements of the integrated sensor 100.

Scaler 114 amplifies the output of adder 112, which is then input to quantizer 116. Quantizer 116, which is coupled to digitizer 120, may allow for a digitized output from quantizer 116. Output response 118, which is coupled to calibrator 122, may provide output 104 in a calibrated manner.

Within integrated sensor 100, sensor response 106, sampler 108, transducer 110, adder 112, scaler 114, quantizer 116, and output response 118 may each contribute to errors and/or faults that can be reported by the sensor. These errors and/or faults can be linear or non-linear in nature. Further, these errors and/or faults may be repeatable for a certain stimulus 102, may be a degradation of one or more portions of integrated sensor 100 over the life of the integrated sensor 100, or may result from a failure of one or more portions of the integrated sensor 100. To assist in assessing the performance and applicability of the integrated sensor, various approaches are used to ensure increased quality and safety goals.

Figure 2:
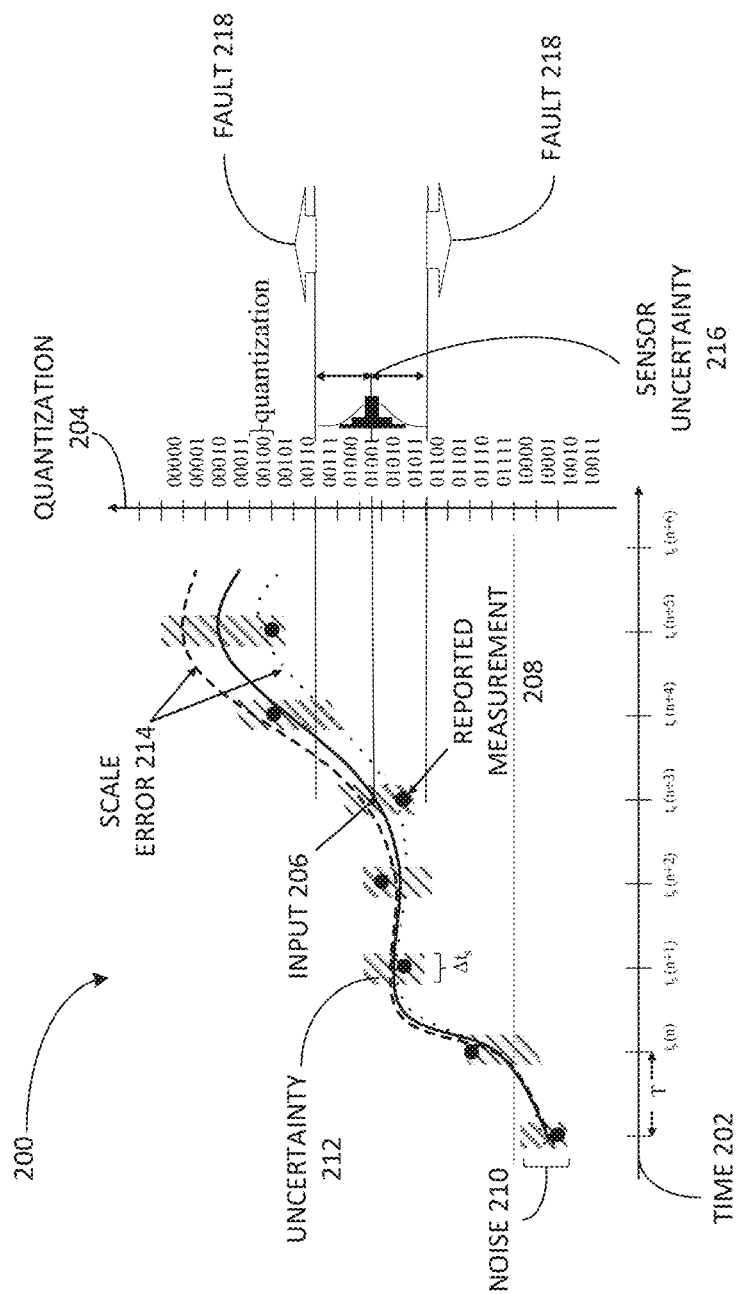
FIG. 2 is a diagram of the scale error impact of sensor uncertainty and faults in accordance with an exemplary aspect of the present disclosure.

FIG. 2 is a diagram of the scale error impact of sensor uncertainty and faults in accordance with an exemplary aspect of the present disclosure.

Graph 200 illustrates time 202 on a horizontal (x) axis and quantization 204 on a vertical (y) axis, with an input 206 to a sensor. The reported measurements 208 are shown as solid dots, with noise 210 and uncertainty 212 of each of the reported measurements 208. The scale error 214 is shown as dotted and dashed lines around the input 206. The quantization 204 of a given measurement, having a sensor uncertainty 216, is also shown along the quantization 204 axis.

For each of the reported measurements 208 of input 206, FIG. 2 shows that there are various error components, e.g., the noise 210, uncertainty 212, scale error 214, and sensor uncertainty 216 that can lead to an output from the sensor that is different than the input 206. Once these errors add up to a value that falls outside of the sensor uncertainty 216, a fault 218 may be reported. For each sensor used in an integrated sensor, the error components, e.g., the noise 210, uncertainty 212, scale error 214, and sensor uncertainty 216 can be different, as the sensors in a redundant and/or integrated sensor are physically different devices or components.

The block diagram of FIG. 1 may be linked to the output shown in FIG. 2. For example, noise 210 of FIG. 2 may be represented by noise 126 in FIG. 1, quantization 126 may be represented by quantization 204, stimulus 102 may be represented by input 206, etc.

Figure 3:
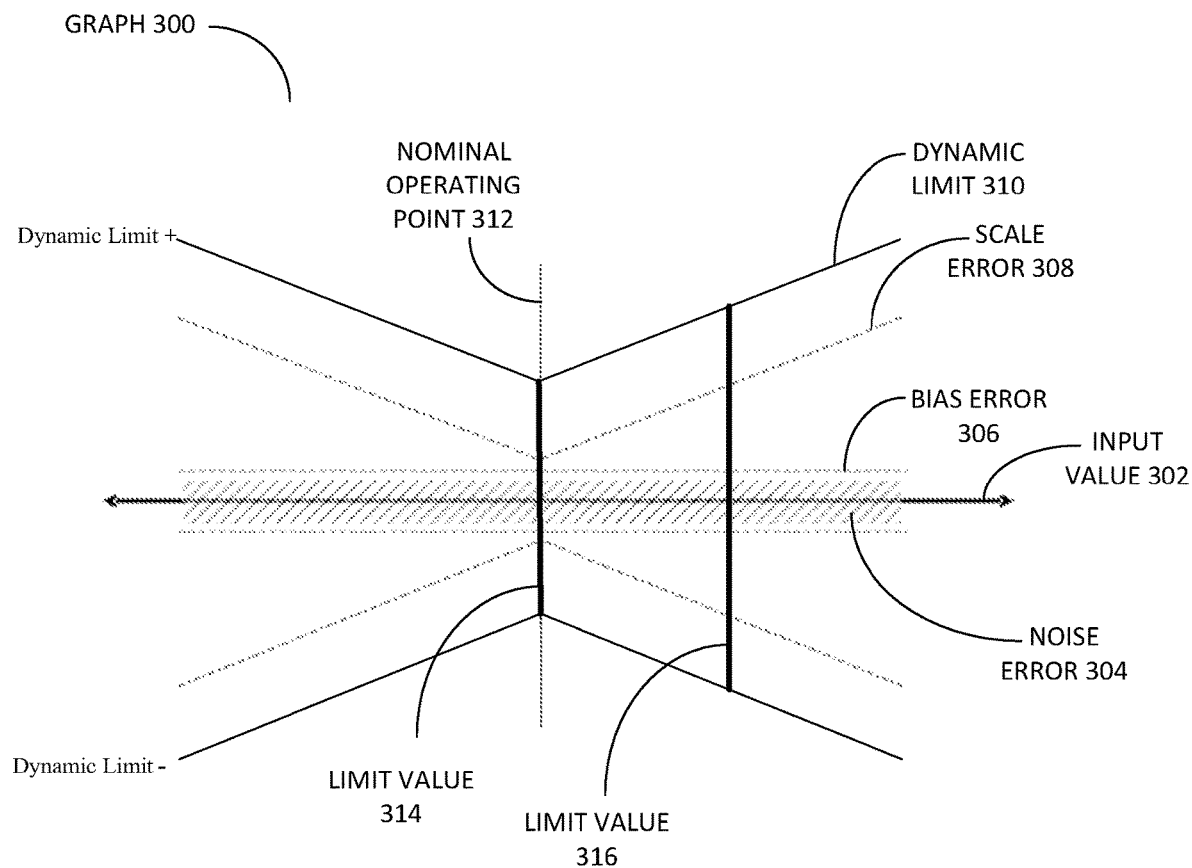
FIG. 3 is a graph of dynamic limits versus input value in accordance with an exemplary aspect of the present disclosure.

FIG. 3 is a graph of dynamic limits versus input value in accordance with an exemplary aspect of the present disclosure.

Graph 300 shows input value 302, noise error 304, bias error 306, scale error 308, dynamic limit 310, and nominal operating point 312. As with FIGS. 1 and 2, various portions of graph 300 may be illustrated or represented in FIG. 3, e.g., input value 302 may be the stimulus 102 and/or input 206, noise error 304 may be illustrated by noise 126 or noise 210, etc.

Input value 302 represents the input value, e.g., stimulus 102, received by the sensor, e.g., integrated sensor 100. Input value 302 can be received by the sensor at any point on the full-scale range (FSR) of the sensor, including at the nominal operating point 312.

Noise error 304 is a representation of the noise and inherent differences of output for a given reading by the sensor. As noise, e.g., noise 126 shown in FIG. 1, is introduced into the sensor, the reading may be affected.

Bias error 306 represents errors in the bias of the sensor, e.g., bias 124 as shown in FIG. 1.

Scale error 308 may indicate the difference in sensor part performance. For example, two sensors with a 1% scale factor error and a 500 unit (u) full scale range (FSR) would have a potential difference in readings of 0.01*(500u−(−500u))=10u.

The 500u FSR could be reduced; however, reducing the FSR increases the potential exposure to inputs beyond the range of this reduced FSR, which may limit the applications that a given sensor can be operated in. Further, maintaining a larger FSR allows for sensor characteristics that may be desired in the application, e.g., faster recovery from transients, integration of transients for system response, etc. A scale error 308 of 1% may be helpful in detecting failures, but there may be tolerance gaps between the performance expectations and the safety concept requirements whenever the scale error 308 is beyond the intended functionality expectations.

Dynamic limit 310 represents the limit of performance response for a given sensor about the nominal operating point 312. As inputs deviate from the nominal operating point 312, the uncertainty of the output of the sensor increases. For example, at nominal operating point 312, the dynamic limit 310 is shown as limit value 314. When the input occurs at a different operating point, an exemplary limit value is shown as limit value 316.

The dynamic limit 310 can be described as the sum of the noise error 304, bias error 306, and scale error 308 at a given operating point. Because the sensor is designed to operate about nominal operating point 312, the dynamic limit 310 may be greater as operating points for the sensor approach the FSR of the sensor, as shown by limit value 314. At such operating points, the possible errors of the output of the sensor are greater. As seen in FIG. 3, the dynamic limit 310 may increase the ability to detect faults with an increase in input value to the sensor.

The dynamic limit 310 may also be described as the limit on the difference between sensors, e.g., differences caused by expected sensor matching and faults. Although dynamic limit 310 may not be increased in aspects of the present disclosure, modification of dynamic limit 310 provides opportunities to increase fault detection are enabled by reducing difference expectations in the dynamic limit 310.

Figure 4:
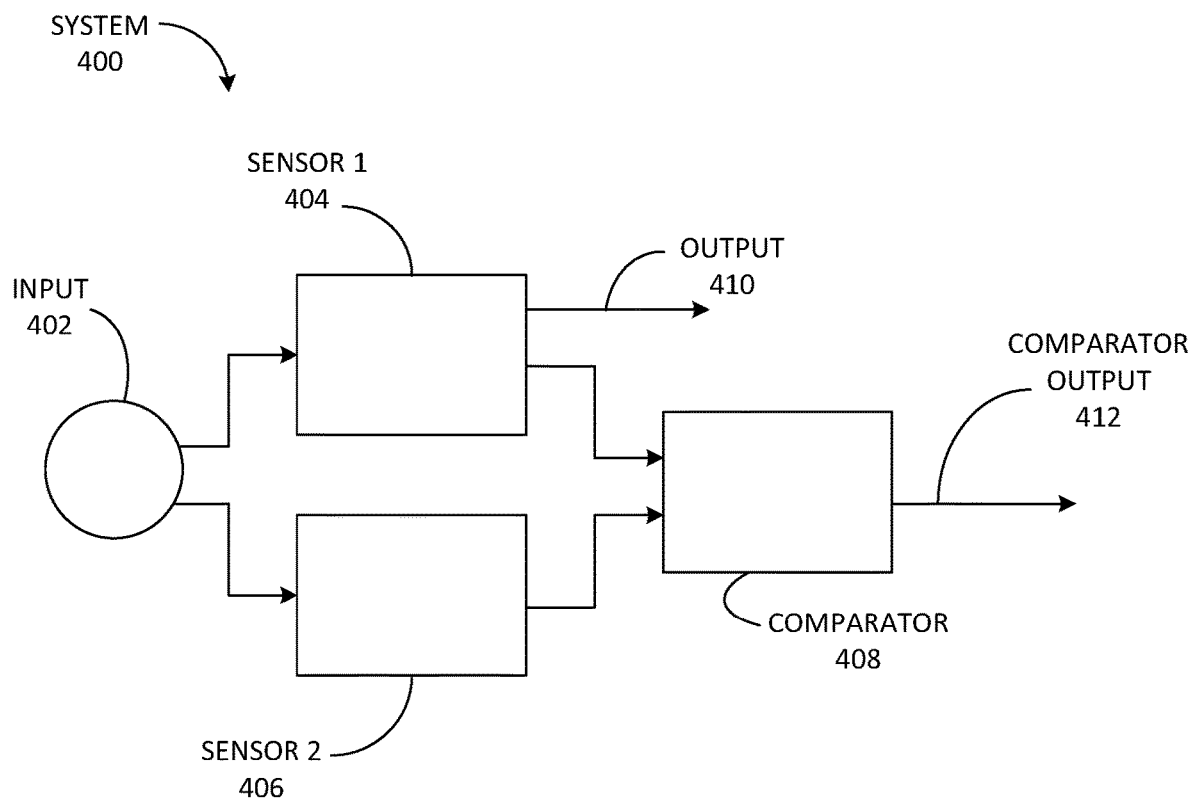
FIG. 4 is a block diagram of a non-dynamic comparison of redundant sensors in accordance with an exemplary aspect of the present disclosure.

FIG. 4 is a block diagram of a non-dynamic comparison of redundant sensors in accordance with an exemplary aspect of the present disclosure.

Many applications require sensor ranges that minimize the opportunities for saturation of the sensor during use. This requirement creates a full scale range that may be much greater than the nominal range of input values. Errors associated with scale may be the main consideration when developing expectations for a multi-sensor comparison function. In an aspect of the present disclosure, increasing the dynamic limit for signals that are outside of mid-scale reading may provide an increase in performance for an integrated sensor system.

System 400 (which may also be referred to as an apparatus herein) may have an input 402, and may include sensor 1 404, sensor 2 406, and comparator 408. The output of system 400 may be designated as output 410, while the output of comparator 408 may be designated as comparator output 412.

As an example, and not by way of limitation, sensor 1 404 may have a fault indication, while sensor 2 406 does not have a fault indication. In such an example, the output 410 of sensor 1 404 ("S1 Output") would be:

$S1 \text{ Output} = \text{Input} + S1(\text{uncertainty}) + \text{fault value}$ The output of sensor 2 406 ("S2 Output") would be:

$S2 \text{ Output} = \text{Input} + S2(\text{uncertainty})$

Where the uncertainties of each sensor would be:

$S1(\text{uncertainty}) \leq ns1 + os1 + SE1 * In(\max)$ $S2(\text{uncertainty}) \leq ns2 + os2 + SE2 * In(\max)$ Where ns is the noise error 304, os is the bias error 306, and SE is the scale error 308, while In(max) is the FSR of the sensor. Without comparator 408, system 400 could not determine whether output 410 had a fault indication or not.

Comparator 408 compares the outputs, e.g., S1 Output (i.e., output 410) and S2 Output. Of course, if more sensors are included in system 400, then comparator 408 may compare some or all of the outputs from each of the sensors included. In the example of FIG. 4, comparator 408 may subtract the outputs of sensor 1 404 and sensor 2 406, and may take the absolute value of this result if desired. As such, the comparator output 412 of system 400 may be:

$\text{Output} = S1(\text{uncertainty}) - S2(\text{uncertainty}) - \text{fault value}$ Which, upon substitution, yields:

$\text{Output} \geq 2 * (ns(\max) + os(\max) + SE(\max) * FS)$

Where ns(max) is the maximum noise error 304, os(max) is the maximum bias error 306, and SE(max) is the maximum scale error 308.

This comparator output 412 can then be assessed against a diagnostic limit to determine if output 410 contains a fault indication.

Figure 5:
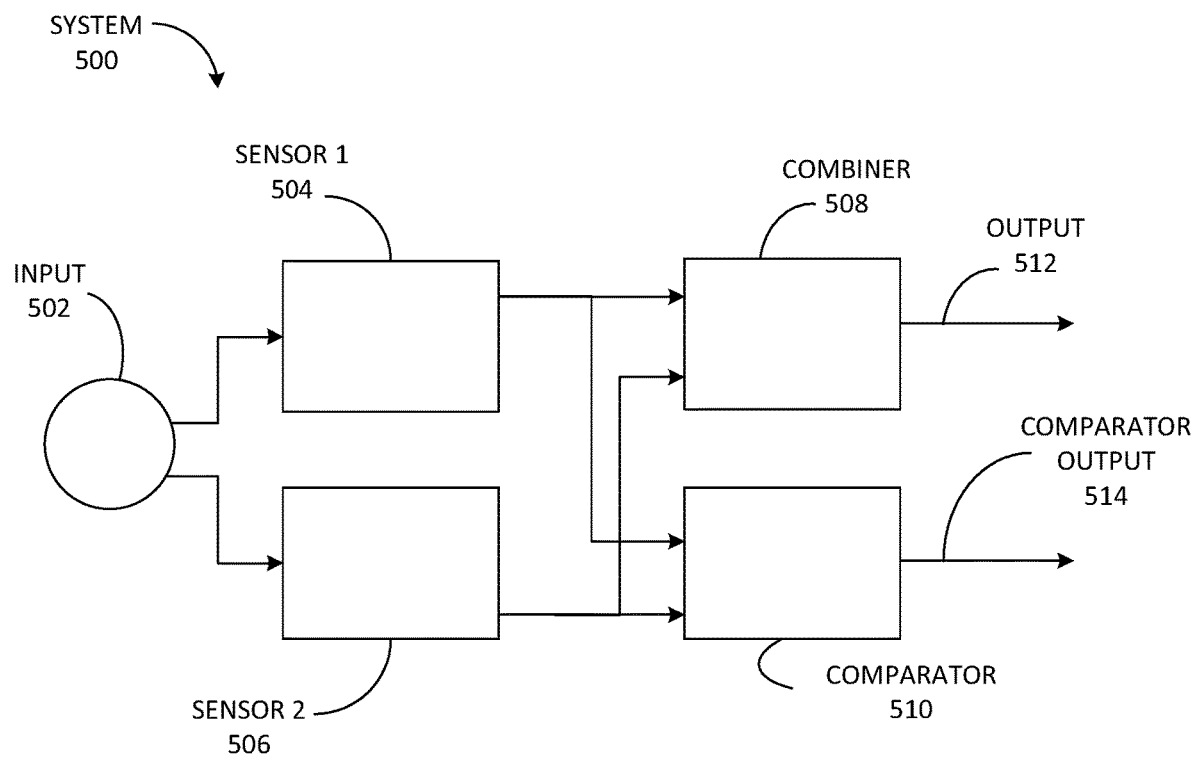
FIG. 5 is a block diagram of a dynamic comparison of redundant sensors in accordance with an exemplary aspect of the present disclosure.

FIG. 5 is a block diagram of a dynamic comparison of redundant sensors in accordance with an exemplary aspect of the present disclosure.

System 500 (which may also be referred to as an apparatus herein) may have an input 502, and may include sensor 1 504, sensor 2 506, combiner 508, and comparator 510. The output of system 500 may be designated as output 512, while the output of comparator 510 may be designated as comparator output 514.

In system 500, combiner 508 may combine the outputs of sensor 1 504 and sensor 2 506 in various ways. For example, and not by way of limitation, combiner 510 may average the outputs of sensor 1 504 and sensor 2 506, i.e., output 512 may be determined as ((Output of sensor 1 504+output of sensor 2 506)/2). Other combinations of the outputs of sensor 1 504 and sensor 2 506, e.g., a weighted average, etc., are also possible without departing from the scope of the present disclosure.

When comparing the outputs of sensor 1 504 and sensor 2 506, using output 512 as a comparison for comparator 510 now increases the fault limit for a given integrated sensor:

$$\text{Output} \geq 2*(ns(\max)+os(\max)+SE(\max)*\text{Input})+\text{DELTA}$$

Where DELTA equals the (uncertainty of sensor 1 504+uncertainty of sensor 2 506+fault)/2. In other words, the difference value to show a fault for the integrated sensor has been increased by the average of the sum of the uncertainties plus the fault reading. The faults modify the dynamic limits by the scale factor times the fault value divided by two, while the fault difference may only be increased by the fault itself. Thus, an integrated sensor now has a broader application, as the sensor can operate at wider ranges away from center of full scale readings, as the fault limits have been expanded to account for modified dynamic operating input ranges. To reduce false fault detection the various errors discussed with respect to FIGS. 1 and 2, e.g., noise, bias, linearity, timing, quantization, and environmental sensitivity error expectations, may be accounted for when setting comparison limits for comparator 510.

Further, comparator output 514 may be compared against a threshold or other value to modify a dynamic limit of a given system 500. For example, and not by way of limitation, the comparator output may be compared against a threshold that is based at least in part on an uncertainty in the output of sensor 1 504 and/or an uncertainty in the output of sensor 2 506. The uncertainty of the outputs of sensor 1 504 and/or sensor 2 506 may be based at least in part by one or more of an input to the sensor, a noise error, an uncertainty error, a scale error, a quantization error, and a sensor uncertainty as described with respect to FIGS. 1 and 2.

Figure 6:
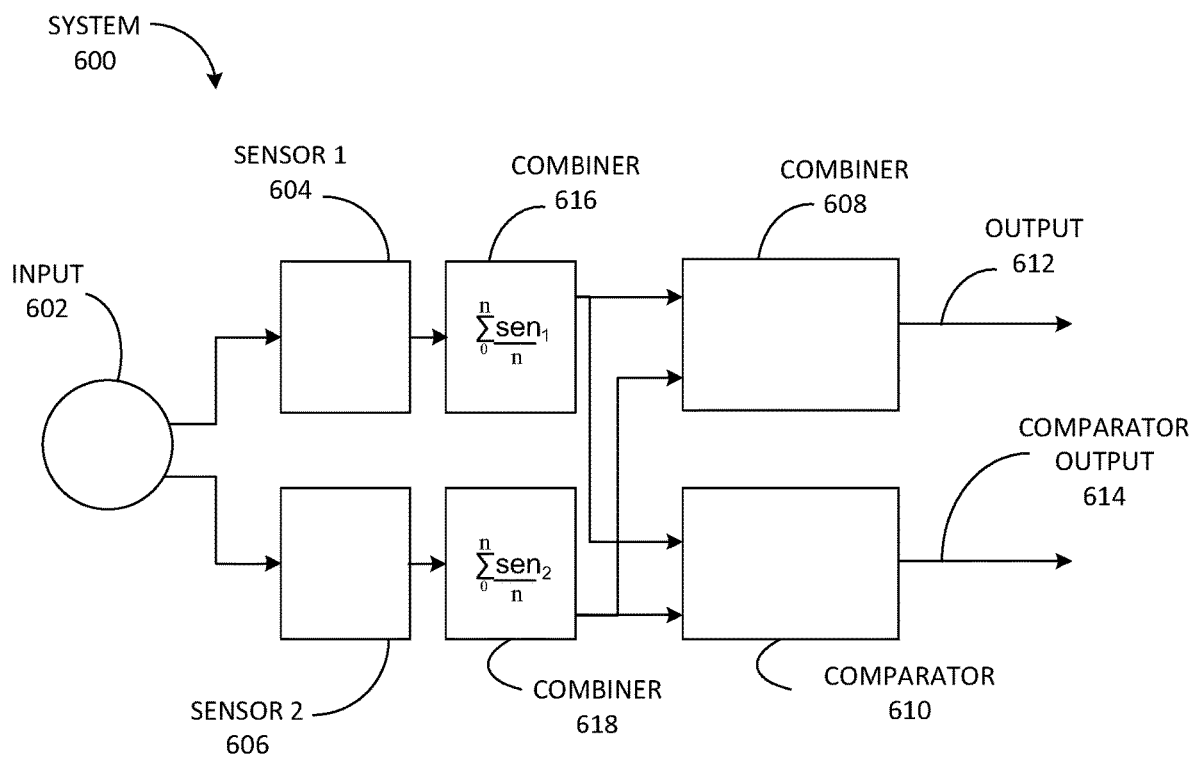
FIG. 6 is a block diagram of a dynamic comparison of redundant sensors in accordance with an exemplary aspect of the present disclosure.

FIG. 6 is a block diagram of a dynamic comparison of redundant sensors in accordance with an exemplary aspect of the present disclosure.

System 600 (which may also be referred to as an apparatus herein) may have an input 602, and may include sensor 1 604, sensor 2 606, combiner 608, and comparator 610. The output of system 600 may be designated as output 612, while the output of comparator 610 may be designated as comparator output 614. System 600 also includes combiner 616 and combiner 618.

As with system 500 discussed with respect to FIG. 5, combiner 608 may combine the outputs of sensor 1 604 and sensor 2 606 in various ways. For example, and not by way of limitation, combiner 608 may average the outputs of sensor 1 604 and sensor 2 606, i.e., output 612 may be determined as ((Output of sensor 1 604+output of sensor 2 606)/2). Other combinations of the outputs of sensor 1 604 and sensor 2 606, e.g., a weighted average, etc., are also possible without departing from the scope of the present disclosure.

In addition, sensor 1 604 may also have a combiner 616 (also referred to as an averager 616) connected to the output of sensor 1 604, and sensor 2 606 may also have a combiner 618 (also referred to as an averager 618) connected to the output of sensor 2 606. Combiner 616 and combiner 618 may take a number of readings from their respective sensors and average those sensor outputs prior to having the outputs of combiners 616 and 618 used as inputs to combiner 608. This may further broaden the dynamic limits of a given integrated sensor, e.g., system 600, for a wider range of input values from input 602. Further, system 600 may provide a way to provide weighted averages for sensor 1 604 and sensor 2 606, as a larger or smaller number of readings can be averaged by one of combiner 616 and combiner 618 prior to their input to combiner 608. To reduce false fault detection the various errors discussed with respect to FIGS. 1 and 2, e.g., noise, bias, linearity, timing, quantization, and environmental sensitivity error expectations, may be accounted for when setting comparison limits for comparator 610.

As the number of samples averaged by combiners 616 and 618 increase, the increased resolution of system 600 may allow the diagnostic coverage of system 600 to increase as well. The sensitivity to single measurement faults reported by system 600 may decrease, as single or low-frequency fault measurements are diffused by the time-averaging and redundant measurement averaging performed by system 600. The impact of a single or low frequency fault may be reduced because such faults have lower impacts the output 612.

Further, and not by way of limitation, the comparator output 614 may be compared against a threshold that is based at least in part on an uncertainty in the output of sensor 1 604 and/or an uncertainty in the output of sensor 2 606. The uncertainty of the outputs of sensor 1 604 and/or sensor 2 606 may be based at least in part by one or more of an input to the sensor, a noise error, an uncertainty error, a scale error, a quantization error, and a sensor uncertainty as described with respect to FIGS. 1 and 2.

The previous description is provided to enable any person skilled in the art to practice the various aspects described herein. Various modifications to the exemplary aspects and aspects presented throughout this disclosure will be readily apparent to those skilled in the art, and the concepts disclosed herein may be applied in other contexts and for different purposes. Thus, the claims are not intended to be limited to the exemplary aspects presented throughout the disclosure, but are to be accorded the full scope consistent with the language claims. All structural and functional equivalents to the elements of the exemplary aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:
1. An apparatus, comprising:
a first sensor configured to output a first output;
a second sensor configured to output a second output;
a combiner, coupled to the first sensor and the second sensor; and
a comparator, coupled to the first sensor and the second sensor, wherein the combiner and comparator are mutually configured to modify a dynamic limit of the apparatus based at least in part on a first uncertainty in the first output of the first sensor and a second uncertainty in the second output of the second sensor, by averaging the first output and the second output, and adding one or more faults detected in the first uncertainty and the second uncertainty, to increase an operating range for detecting uncertainties outputted by the first sensor and/or the second sensor.

2. The apparatus of claim 1, wherein the comparator compares an average of the first output and the second output against a threshold.

3. The apparatus of claim 2, wherein the first uncertainty in the first output is determined at least in part by one or more of a first noise error, a first uncertainty error, a first scale error, a first quantization error, and a first sensor uncertainty.

4. The apparatus of claim 3, wherein the second uncertainty in the second output is determined at least in part by one or more of a second noise error, a second uncertainty error, a second scale error, a second quantization error, and a second sensor uncertainty.

5. The apparatus of claim 4, wherein the dynamic limit is based at least in part on an input to the first sensor and the second sensor.

6. The apparatus of claim 5, wherein the dynamic limit is modified as the input deviates from a nominal value.

7. The apparatus of claim 1, further comprising a first averager coupled to the first sensor.

8. The apparatus of claim 7, wherein the first averager averages a plurality of first outputs of the first sensor.

9. The apparatus of claim 8, wherein the combiner averages an output of the first averager.

10. The apparatus of claim 7, further comprising a second averager coupled to the second sensor.

11. The apparatus of claim 10, wherein the second averager averages a plurality of second outputs of the second sensor.

12. The apparatus of claim 11, wherein the combiner averages an output of the first averager and an output of the second averager.

13. An integrated sensor, comprising:
a first sensor configured to output a first output;
a second sensor configured to output a second output;
a combiner, coupled to the first sensor and the second sensor; and
a comparator, coupled to the first sensor and the second sensor, wherein the combiner and comparator are mutually configured to modify a dynamic limit of the apparatus based at least in part on a first uncertainty in the first output of the first sensor and a second uncertainty in the second output of the second sensor, by averaging the first output and the second output, and adding one or more faults detected in the first uncertainty and the second uncertainty, to increase an operating range for detecting uncertainties outputted by the first sensor and/or the second sensor.

14. The integrated sensor of claim 13, wherein the comparator compares an average of the first output and the second output against a threshold.

15. The integrated sensor of claim 14, wherein the first uncertainty in the first output is determined at least in part by one or more of a noise error, an uncertainty error, a scale error, a quantization error, and a sensor uncertainty.

16. The integrated sensor of claim 13, wherein the dynamic limit is based at least in part on an input to the first sensor and the second sensor.

17. The integrated sensor of claim 13, further comprising a first averager coupled to the first sensor.

18. The integrated sensor of claim 17, wherein the combiner averages an output of the first averager.

* * * * *